(12) United States Patent
Yamaguchi et al.

(10) Patent No.: US 7,804,959 B2
(45) Date of Patent: Sep. 28, 2010

(54) DIGITAL CABLE TELEVISION BROADCASTING RECEIVER

(75) Inventors: Masashi Yamaguchi, Osaka (JP); Teruhide Kita, Hirakata (JP); Tsuneo Danno, Katano (JP)

(73) Assignee: Panasonic Corporation, Osaka (JP)

( * ) Notice: Subject to any disclaimer, the term of this patent is extended or adjusted under 35 U.S.C. 154(b) by 1276 days.

(21) Appl. No.: 11/345,029

(22) Filed: Feb. 1, 2006

(65) Prior Publication Data

US 2007/0172059 A1 Jul. 26, 2007

Related U.S. Application Data

(60) Provisional application No. 60/649,332, filed on Feb. 2, 2005.

(30) Foreign Application Priority Data

Feb. 1, 2005 (JP) ............... 2005-024756

(51) Int. Cl.
*H04N 7/167* (2006.01)
(52) U.S. Cl. ...................... 380/228; 380/242
(58) Field of Classification Search ........... 380/228
See application file for complete search history.

(56) References Cited

U.S. PATENT DOCUMENTS

| | | | | |
|---|---|---|---|---|
| 7,039,802 | B1* | 5/2006 | Eskicioglu et al. | 713/156 |
| 7,383,438 | B2* | 6/2008 | Fahrny et al. | 713/169 |
| 7,477,744 | B2* | 1/2009 | Schipper | 380/239 |
| 7,508,942 | B2* | 3/2009 | Candelore | 380/239 |
| 7,526,245 | B2* | 4/2009 | Bushner | 455/3.02 |
| 2002/0120574 | A1 | 8/2002 | Ezaki | |
| 2002/0146125 | A1* | 10/2002 | Eskicioglu et al. | 380/255 |
| 2003/0059047 | A1* | 3/2003 | Iwamura | 380/201 |
| 2004/0088552 | A1* | 5/2004 | Candelore | 713/185 |
| 2004/0190721 | A1* | 9/2004 | Barrett et al. | 380/277 |
| 2004/0250273 | A1* | 12/2004 | Swix et al. | 725/25 |
| 2005/0084100 | A1* | 4/2005 | Spies et al. | 380/30 |

FOREIGN PATENT DOCUMENTS

| JP | 07-245594 A | 9/1995 |
|---|---|---|
| JP | 08-077263 A | 3/1996 |

(Continued)

OTHER PUBLICATIONS

"A Common Smart-card-based Conditional Access System for Digital Set-Top Boxes", Meng Zheng and Shi-Bao Zheng, Mar. 2004. IEEE Transactions on Consumer Electronics, vol. 50, Issue 2, May 2004, pp. 601-605.*

(Continued)

*Primary Examiner*—Gilberto Barron, Jr.
*Assistant Examiner*—David Le
(74) *Attorney, Agent, or Firm*—RatnerPrestia

(57) ABSTRACT

A global platform card manager of the IC card chip includes a conditional access software decoding part. A decoding key specific to each conditional access software vendor and a key identification number corresponding to the decoding key are preset in the conditional access software decoding part. The conditional access software encrypted by the conditional access software vendor is decoded using the decoding key designated by the key identification number in the conditional access decoding part, when received.

4 Claims, 6 Drawing Sheets

| | FOREIGN PATENT DOCUMENTS | |
|---|---|---|
| JP | 08-294109 A | 11/1996 |
| JP | 11-146293 A | 5/1999 |
| JP | 2001-119357 | 4/2001 |
| JP | 2001-350728 A | 12/2001 |
| JP | 2002-123496 A | 4/2002 |
| JP | 2004-013728 | 1/2004 |
| JP | 2004-535730 A | 11/2004 |
| JP | 2005-269578 A | 9/2005 |
| WO | WO 03/007609 A1 | 1/2003 |

OTHER PUBLICATIONS

Japanese Search Report for Application No. PCT/JP2006/301571, dated May 16, 2006.

Supplementary European Search Report for EP 06 71 2714, dated Mar. 19, 2007.

* cited by examiner

DIGITAL CABLE TELEVISION BROADCASTING RECEIVER

This application claims the benefit under 35 U.S.C. §119 (e) of U.S. Provisional Application 60/649,332 filed Feb. 2, 2005 which is hereby incorporated by reference.

BACKGROUND OF THE INVENTION

1. Field of the Invention

The present invention relates to a digital cable television broadcasting receiver capable of downloading the conditional access software in the digital cable television broadcasting that makes the conditional access.

2. Related Art of the Invention

In the satellite broadcasting or the digital broadcasting of cable television, the conditional access is widely employed for charging management and contents protection. A conditional access method in the digital broadcasting was described in ARIB STD-B25 in Japan. A conditional access function on the receiver side is implemented on an IC card, which is a B-CAS card in the satellite broadcasting or a C-CAS card in the cable television broadcasting. In the United States, the conditional access function is mounted in a module (on-board) as the built-in function on the receiver.

A scheme of the conditional access is implemented by sending an ECM (Entitlement Control Message) and an EMM (Entitlement Management Message) from a conditional access control facility installed at head-end to the receiver to be controlled. The EMM encrypts a work key by a master key (device key) allocated to each receiver or each conditional access card, and the conditional access function of each receiver or each conditional access card involves decrypting the work key sent with the EMM using its own master key and decoding the ECM sent together with video data to obtain a scramble key for unscrambling.

FIG. 5 (a) is a block diagram showing a configuration example of the conventional IC card, and FIG. 5 (b) is a block diagram showing the configuration of the conventional modules. A conditional access control head-end 4 sends the EMM and the ECM on a TS (Transport Stream) to a conditional access IC card 6 or a conditional access module 7 mounted on a receiver 1. A conditional access IF part is an interface part to the conditional access IC card 6 or the conditional access module 7 contained in the receiver 1.

However, there are increasing demands for a VOD (Video On Demand) and the next generation bi-directional services. For the conditional access method, it is required to cope with those new services flexibly. Also, with the conventional IC card or built-in feature, the software cannot be improved even if the conditional access function has a problem. Also, in the type where the conditional access function is built in, it is required to cope with the conditional access function for plural vendors, resulting in a problem that the receiver can not be made common. Therefore, supposedly, a new scheme for downloading and updating the conditional access function (software) held in the receiver from the head-end is required.

Since a conditional access software has a high confidentiality, high security is required for downloading. Therefore, an authentication between a downloader and an IC card chip and a secure communication by the encryption of data are requisite. For the procedures of the authentication and the encryption, an authentication using a hash function such as de facto MD5 and SHA-1 and so on and a method using an encryption algorithm such as AES and RSA and so on can be uniquely built.

On the other hand, in the IC card such as a credit card, plural applications such as the ID card are generally mounted, besides the conventional credit purchase. In such IC card, the applications need to be updated. JAVA (registered trademark) card with a global platform (GlobalPlatform) technique capable of downloading the application is marketed, whereby the secure download technique has been established. The specifications of the global platform are publicized in a global platform consortium.

FIG. 6 is a block diagram of the global platform. The IC card chip 2 has an execution environment 28 including the software for a card OS, JAVA (registered trademark), VM (Virtual Machine), and a global platform API (application interface), in addition to a hardware environment of CPU and memory. Downloading the application onto the IC card chip 2 corresponding to the global platform technique is made by establishing a secure communication path between a global platform card manager 21 mounted on the IC card chip 2 and a card issuer 31 that is the download host, based on an encryption key preset for the global platform card manager 21, and downloading the application software 29 via the global platform card manager 21. When the secure communication path is established, the global platform card manager 21 sends the authentication information (global platform identification number) to the card issuer 31 that is the download host to make the authentication, employing the preset encryption key.

On the other hand, if the IC card chip 2 is used and the global platform is not used, the portion corresponding to the card manager 21 is implemented as a dedicated application on the card OS. In this case, the interface between the downloader corresponding to the card issuer 31 or application service provider 41 and the card manager 21 is specific depending on the card OS. (refer to Japanese Patent Application Laid-Open No. 2001-119357, Japanese Patent Application Laid-Open No. 2004-13728, Conditional access method in digital broadcasting ARIB STD-B25 and the GlobalPlatform Card Specifications (by the GlobalPlatform consortium)).

If a mechanism of securely downloading the conditional access software of the digital cable television to the IC card or IC card chip can be built, it is possible to download and update said new service, which is very beneficial.

Also, if the IC card or IC card chip corresponding to the global platform technique is employed for downloading the conditional access software of the digital cable television, the open chip and software environment can be utilized, in which the scheme for downloading is assured to be secure, and established with the technique on the operational side, which is very convenient.

However, a number of conditional access facilities of the digital cable television exist in every broadcasting district, and its operation is made separately from a development company of the conditional access software. In the case of the cable television, it is common that the cable operator operates this television. Accordingly, a scheme for hiding the conditional access software from the operator is required from the nature of the conditional access software. For example, the global platform technique assumes only the configuration that the card issuer downloads the application, or that the application provider directly downloads the application, whereby the scheme of IC card corresponding to the global platform technique can not be directly employed in the cable television scheme in which the head-end operator that is not the application provider downloads the conditional access software of the application.

In the case where the conventional conditional access function was mounted in the built-in type, the identification number of conditional access was set when the function was built in, and managed integrally with the identification number of the receiver, whereby individual receivers could be controlled. Also, in the case of the IC card type, the identification number of conditional access is set in advance in the IC card, and the management number of the IC card is managed, whereby the individual IC card can be identified. However, to download the conditional access software to the IC card or IC card chip, and to control the conditional access from the head-end in accordance with the contract condition of the subscriber, it is required that the conditional access control software of the head-end identifies the conditional access software of each receiver and sends the EMM to the conditional access software that is the downloaded application software. For example, it is only the individual encryption key of the global platform card manager that is defined in the global platform, and no identification information for the conditional access software that is the global platform application is defined. Accordingly, the scheme for the IC card corresponding to the global platform technique can not be directly employed in the scheme for the cable television, whereby it is required to provide a scheme for newly setting the identification information of the conditional access reception software to be downloaded and the individual key (device key) for conditional access in association with the individual receiver.

Also, when secure communication is performed between the downloader and the IC card chip, it is required to set the encryption key in the card manager. However, in the case of the credit card, for example, the card issuer can consistently set the encryption key in the IC card, issue the card and download the application at one site in high security. However, in the case of the cable television, a cable operation company or a key issuance management company of neutral authentication authority is supposed to set the encryption key to the IC card chip, but the IC card chip is supplied to plural receiver makers and packaged, and provided to the subscriber with the receiver. Since it is difficult to set the encryption key to the global platform card manager in the light of the operation and the security, after packaging the IC card chip in the receiver, it is required to set in advance the encryption key in a state of the IC card chip. However, if the scheme for the IC card corresponding to the global platform technique is directly employed in the scheme for the cable television, the operation of the IC card chip possibly becomes complex.

Also, when the conditional access software is downloaded to the IC card chip, the download of the application occurs into the IC card chip which is connected to the download host at a moment when the IC card is inserted into a card reader. In the case of the digital cable television receiver, it is always supposed that the receiver makes an issuance even when there is a modem such as DOCSIS, whereby it is not possible to make the connection from the download host. The receiver may be periodically connected to the download host to download the application. But the number of connected receivers is supposedly from about hundred thousands to one million per head-end, it is unrealistic to wait for the connection from the receiver to download the application. Accordingly, the scheme for the IC card corresponding to the global platform technique can not be directly employed in the scheme for the cable television, for example, whereby it is required to provide a new scheme for allowing the connection from the download host to the desired receiver.

SUMMARY OF THE INVENTION

The present invention provides a digital cable television broadcasting receiver for downloading the conditional access software as the application software into an IC card chip, wherein a conditional access software decoding part is provided in a card manager of the IC card chip, a decoding key specific to each conditional access software vendor and a key identification number corresponding to the decoding key are preset in the conditional access software decoding part, and the conditional access software encrypted by the conditional access software vendor is decoded using the decoding key designated by the key identification number in the conditional access software decoding part, when received.

Also, a receiver identification number holding part specific to each receiver is provided, and the conditional access software is provided with a receiver identification number reading part and a conditional access software identification number holding part, in which after the conditional access software is downloaded, the receiver identification number saved in the receiver identification number holding part is read from the receiver identification number reading part and notified to a download host, the conditional access software identification number specific to each IC card chip sent from the download host and a device key for conditional access are saved in the conditional access software identification number holding part, and the conditional access is performed based on the saved conditional access software identification number and the conditional access device key, when a conditional access control command is received.

Also, a receiver identification number holding part specific to each receiver is provided, and a card manager of the IC card chip is provided with a receiver identification number reading part and an authentication information generation part, in which when the card manager establishes a secure communication path with a download host, the authentication information generation part generates an authentication information to be notified to the download host, based on a receiver identification number read through the receiver identification number reading part from the receiver identification number holding part, and notifies it.

Also, the receiver is provided with a receiver identification number holding part specific to each receiver, a connection address holding part for a download host, and a connection control part for connecting to the download host when there is a notice of connection instruction from the download host, the connection control part connects to the download host after a time dependent upon the receiver identification number, based on a receiver identification number read through the receiver identification number reading part from the receiver identification number holding part, when there is a notice of connection instruction broadcast from the download host, and the download host starts to download the conditional access software.

With this invention, the conditional access software can be hidden from the operator, and downloaded, employing the IC card chip.

Also, even if the conditional access software is downloaded, the head-end side can collectively manage the identification numbers of the receiver, the card manager and the conditional access software, whereby it is possible to perform the conditional access control according to the contract from the conditional access control head-end to the receiver of the subscriber to be controlled.

Also, it is unnecessary that the encryption key specific to the card manager is set to the card manager, whereby it is possible to solve the problem that if the scheme for the IC card corresponding to the global platform technique is directly employed in the scheme for the cable television, the operation of the IC card chip becomes complex.

Also, the connection moment for downloading can be given from the head-end side, whereby when it is necessary to download into the specific receiver type or the receiver with specific contract, it is possible to solve the problem that it is unrealistic to wait for the connection from the specific receiver to download.

DESCRIPTION OF SYMBOLS

Figure 1:
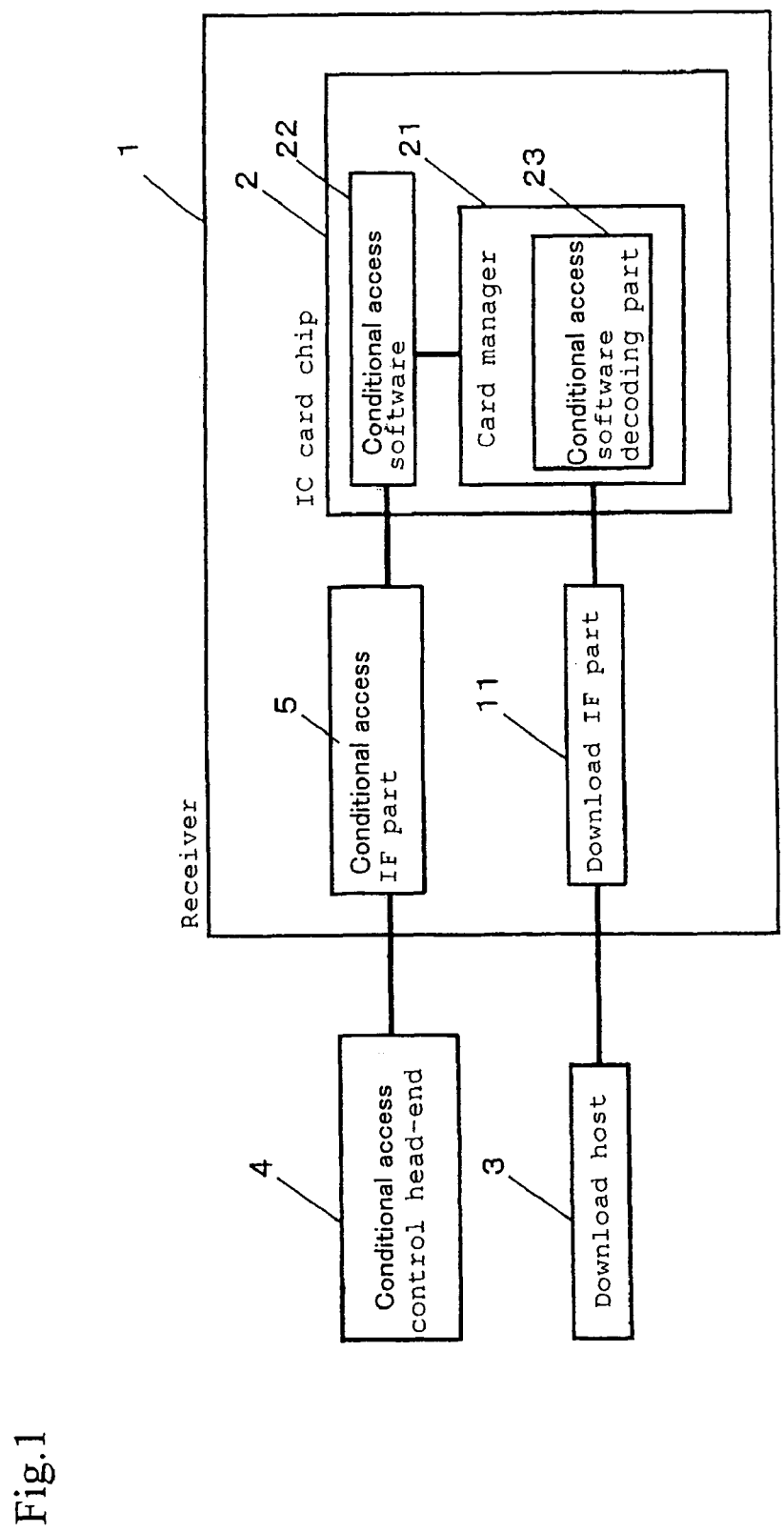
FIG. 1 is a block diagram showing the configuration of a cable television broadcasting receiver according to the present invention.

1 Receiver
2 IC card chip
3 Download host
4 Conditional access control head-end
5 Conditional access IF part
6 Conditional access IC card
7 Conditional access module
11 Download IF part
12 Receiver identification number holding part
13 Host connection address holding part
14 Connection control part
21 Card manager
22 Conditional access software
23 Conditional access software decoding part
24 Receiver identification number reading part
25 Conditional access software identification number holding part
26 Receiver identification number reading part
27 Authentication information generation part
28 Execution environment
29 Application software
31 Card issuer
41 Application service provider

PREFERRED EMBODIMENTS OF THE INVENTION

Figure 5A:
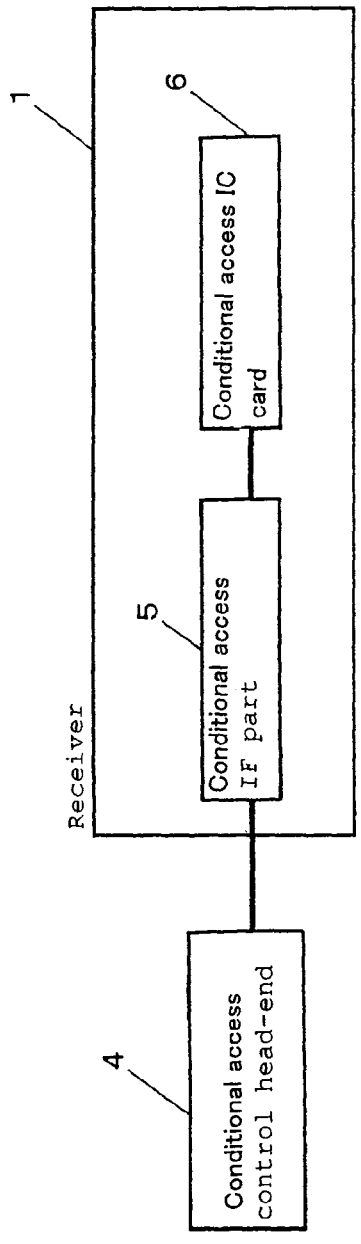
FIG. 5 is a diagram showing the configuration of the conventional cable television broadcasting receiver.
Figure 5B:
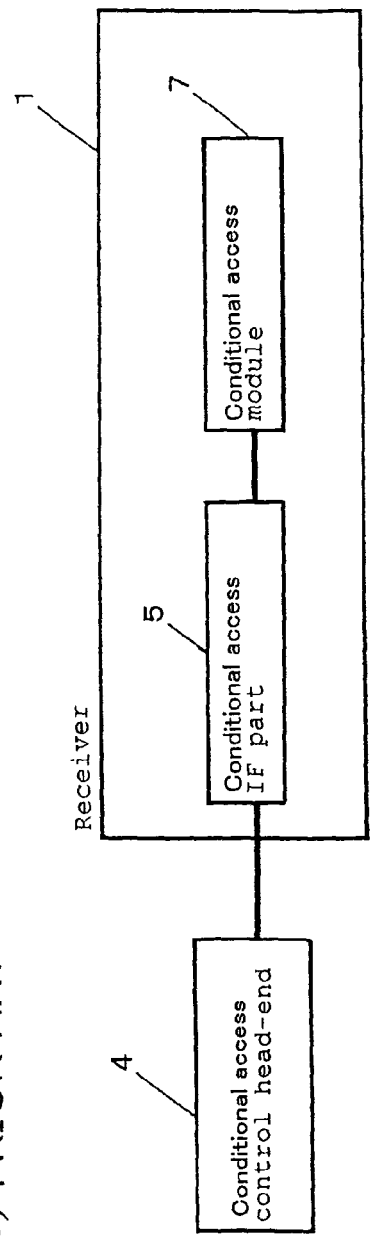
Figure 6:
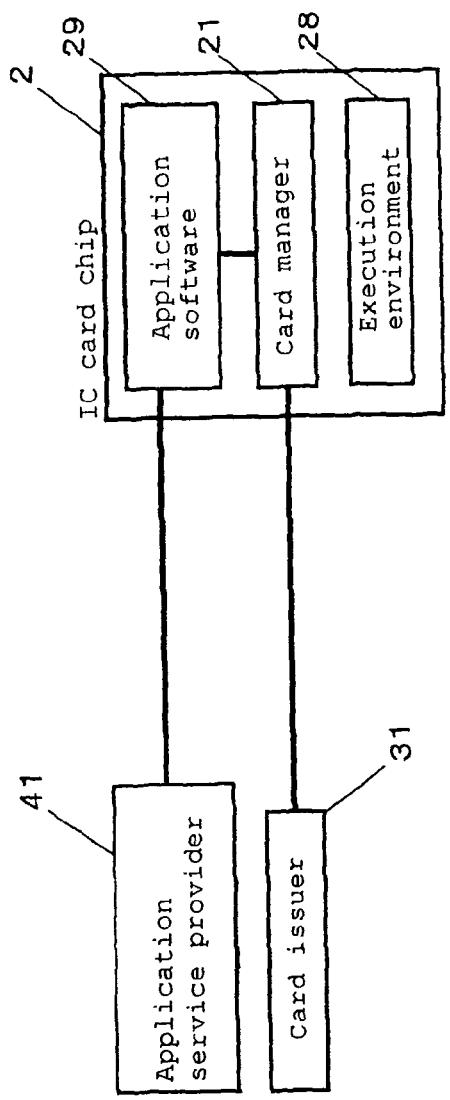
FIG. 6 is a diagram showing the configuration of an IC card chip in the global platform specifications.

FIG. 1 is a block diagram showing the configuration of a digital cable television receiver according to the present invention. An IC card chip 2 built in the receiver 1 is an IC card chip where the above-mentioned card manager is built as a dedicated application or an IC card chip according to the global platform specifications, in which a conditional access software decoding part 23 is extended to a card manager 21. The case of a global platform specification is described below. In FIG. 1, an execution environment following the global platform API is omitted. The card manager 21 according to the global platform specifications is incorporated into the IC card chip 2, to establish a secure communication with a download host 3, based on an individual decoding key preset to the card manager and download the conditional access software 22 of application software. A download IF (interface) part 11 is the software within the receiver 1 to pass the download software received from the download host 3 to the card manager 21. The communication is made via a modem (not shown). The downloaded conditional access software 22 is encrypted beforehand by an encryption key allocated to the conditional access software vendor. The encryption key is issued to each conditional access software vendor by a key issuance management company. In advance, the decoding key and the key identification number corresponding to the decoding key are set in the conditional access software decoding part 23 within the card manager 21. The download host 3 sends the conditional access software 22 encrypted by the encryption key and the key identification number via the download IF part to the card manager 21 in downloading the conditional access software 22. In downloading the conditional access software 22, the conditional access software decoding part 23 decodes the conditional access software 22 employing the decoding key corresponding to the key identification number, to download it as the application software according to the global platform specifications. As a result, the conditional access software 22 can be operated in the form hidden from the downloading head-end. Also, the key identification number may be added to the encrypted conditional access software 22, and forwarded, whereby a scheme for downloading the conditional access software for plural conditional access vendors to the receiver in the open specification can be provided. After the conditional access software 22 is downloaded, the EMM and the ECM from the conditional access control head-end 4 are analyzed to make the conditional access control, like the conventional conditional access software with the configuration of FIG. 5. In the above explanation, the IC card chip of built-in type has been described, but an IC card may be also treated.

Figure 2:
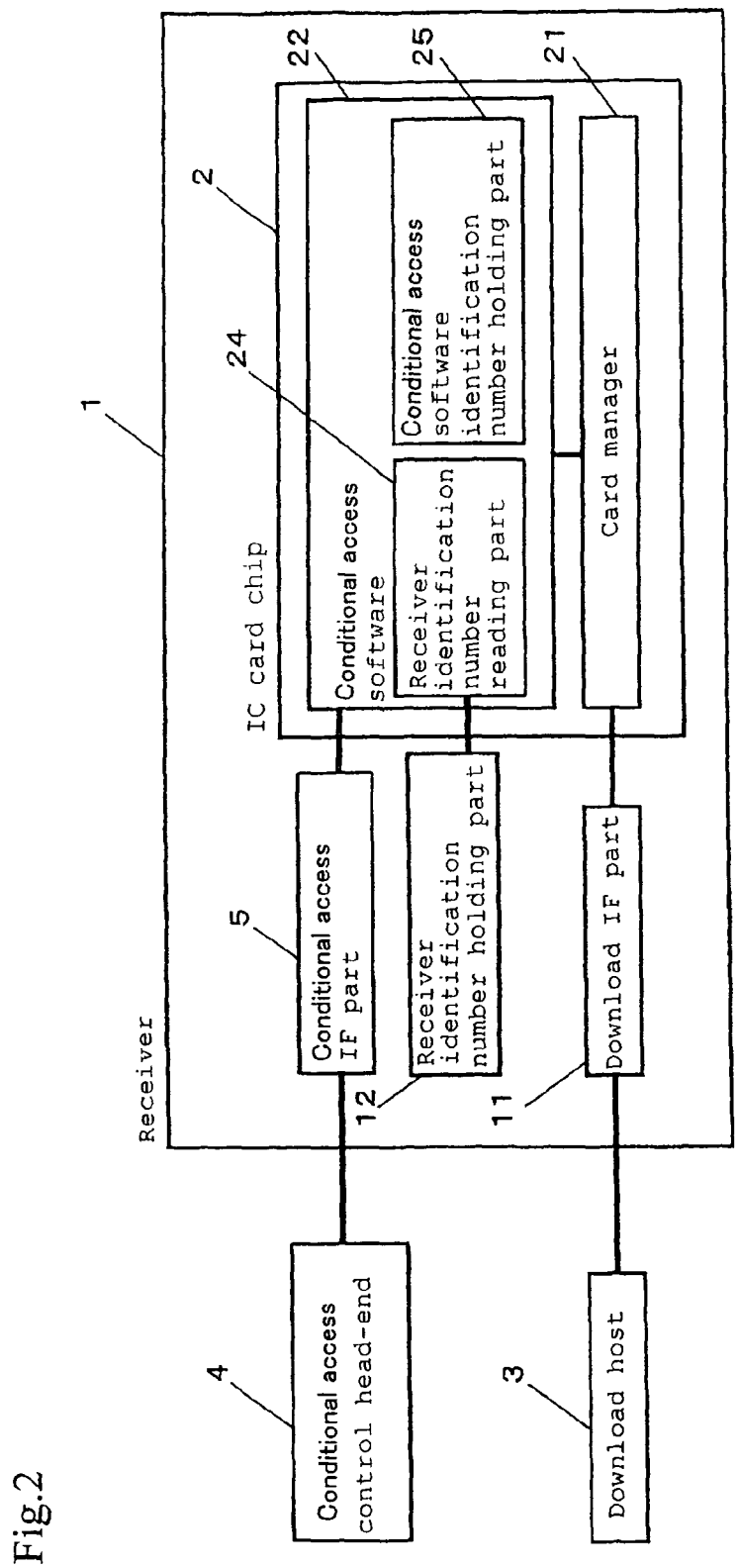
FIG. 2 is a block diagram showing the configuration of the cable television broadcasting receiver according to the invention.

FIG. 2 is a block diagram showing the configuration of the digital cable television receiver according to the invention. An IC card chip 2 built in the receiver 1 is an IC card chip where the above-mentioned card manager built is built as a dedicated application or an IC card chip according to the global platform specifications. The case of a global platform specification is described below. A method of downloading the conditional access software is similarly made based on the global platform specifications. The receiver 1 is provided with a receiver identification number holding part 12 for holding the receiver identification number. Also, a receiver identification number reading part 24 for reading the receiver identification number from the receiver identification number holding part 12 and a conditional access software identification number holding part 25 for holding the conditional access software identification number and a conditional access device key (master key) are provided within the conditional access software 22 of the IC card chip 2. In establishing a secure communication path to the download host 3 installed at the head-end, a card manager 21 sends the authentication information to the download host 3, employing an individual encryption key set for the card manager 21, according to the global platform specifications. With this authentication information, the download host 3 can identify the card manager 21 of communication destination. After downloading the conditional access software 22, the receiver identification number held in the receiver identification number holding part 12 of the receiver 1 is further read from the receiver identification number reading part 24, and notified to the download host, whereby the download host 3 installed at the head-end can manage the card manager 21 and the receiver 1 in association. The communication between the conditional access software 22 and the download host 3 is made based on the global platform specifications. Moreover, the download host 3 sets the conditional access software identification number and the device key (master key) for conditional access in the conditional access software identification number holding part 25 within the conditional access software 22. Accordingly, the head-end side can collectively manage the identification numbers of the receiver 1, the card manager 21 and the conditional access software 22, whereby the conditional access control can be made based on the contract from the conditional access control head-end 4 to the receiver 1 of the subscriber to be controlled. Also, the work key sent with the EMM is decrypted by its own master key, employing the set device key for conditional access (master key), and the ECM sent together with the video data is decoded to acquire a scramble key for unscrambling, whereby the scrambled video signal can be decrypted. In this example, the conditional access software identification number and the device key (master key) for conditional access are set in the conditional access software identification number holding part 25, but the conditional access software identification number and the device key (master key) for conditional access may be set in another holding part. Also, in this example, the conditional access software identification number and the device key (master key) for conditional access are set from the download host 3, but may be set from the conditional access control head-end 4. Also, they may be set in advance in the IC card chip 2.

Figure 3:
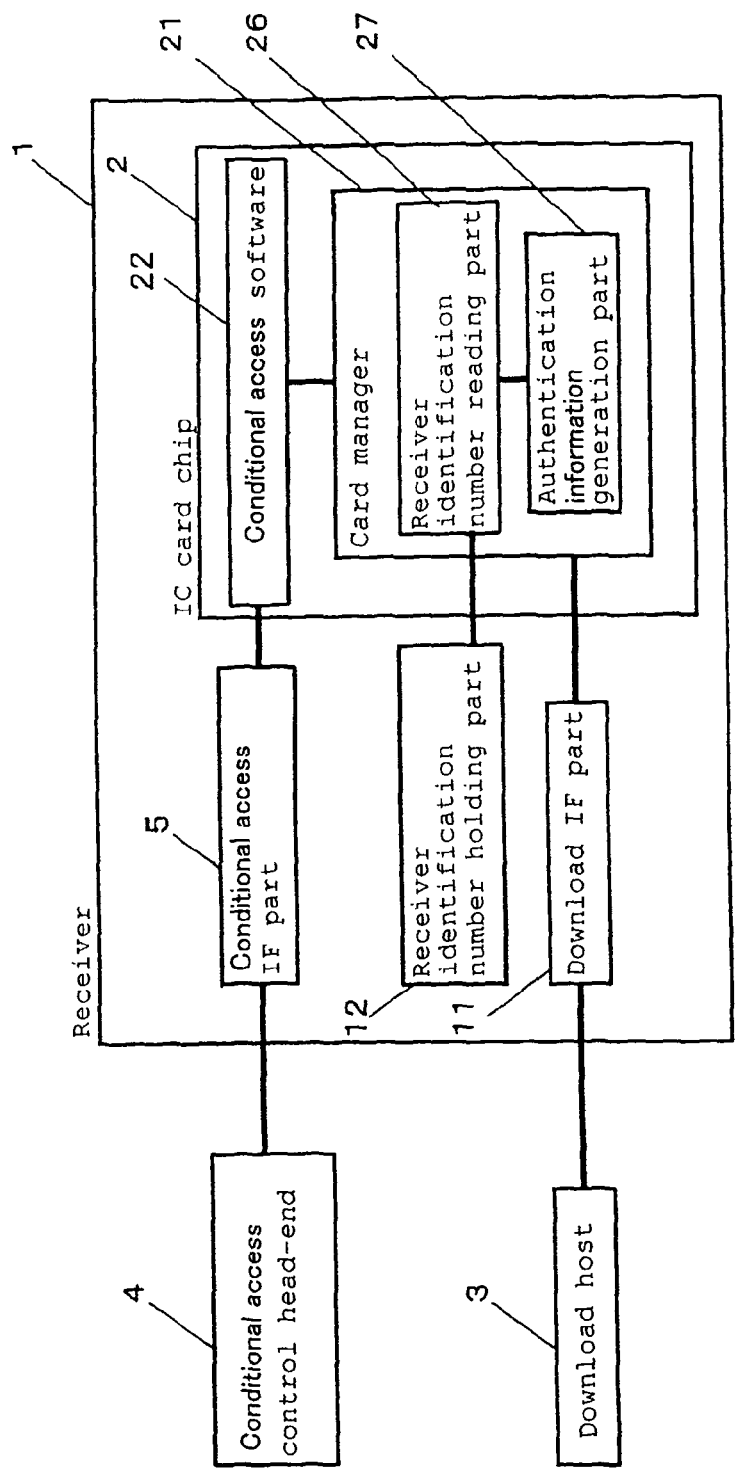
FIG. 3 is a block diagram showing the configuration of the cable television broadcasting receiver according to the invention.

FIG. 3 is a block diagram showing the configuration of the digital cable television receiver according to the invention. An IC card chip 2 built in the receiver 1 is an IC card chip that the above-mentioned card manager is built as a dedicated application or an IC card chip according to the global platform specifications. The case of a global platform specification is described below. A method of downloading the conditional access software is similarly made based on the global platform specifications. The receiver 1 is provided with a receiver identification number holding part 12 for holding the receiver identification number. Also, a receiver identification number reading part 26 for reading the receiver identification number from the receiver identification number holding part 12 and an authentication information generation part 27 for generating the authentication information for use when the card manager 21 establishes the secure communication path according to the global platform technique with the download host 3, based on the receiver identification number read from the receiver identification number reading part 26, are provided within the card manager 21 of the IC card chip 2. The authentication information generation part 27 produces the authentication information, with the read receiver identification number or the information generated from the receiver identification number as an individual key. The download host 3 also holds the information for generating the authentication information in the same way as the authentication generation part, based on the receiver identification number provided from the maker of the receiver 1. The authentication is made by comparing the held authentication information and the authentication information notified from the card manager 21 at the time of authentication with the card manager 21. With this method, it is unnecessary that the encryption key specific to the card manager is preset in the card manager 21, whereby the operation is facilitated.

Figure 4:
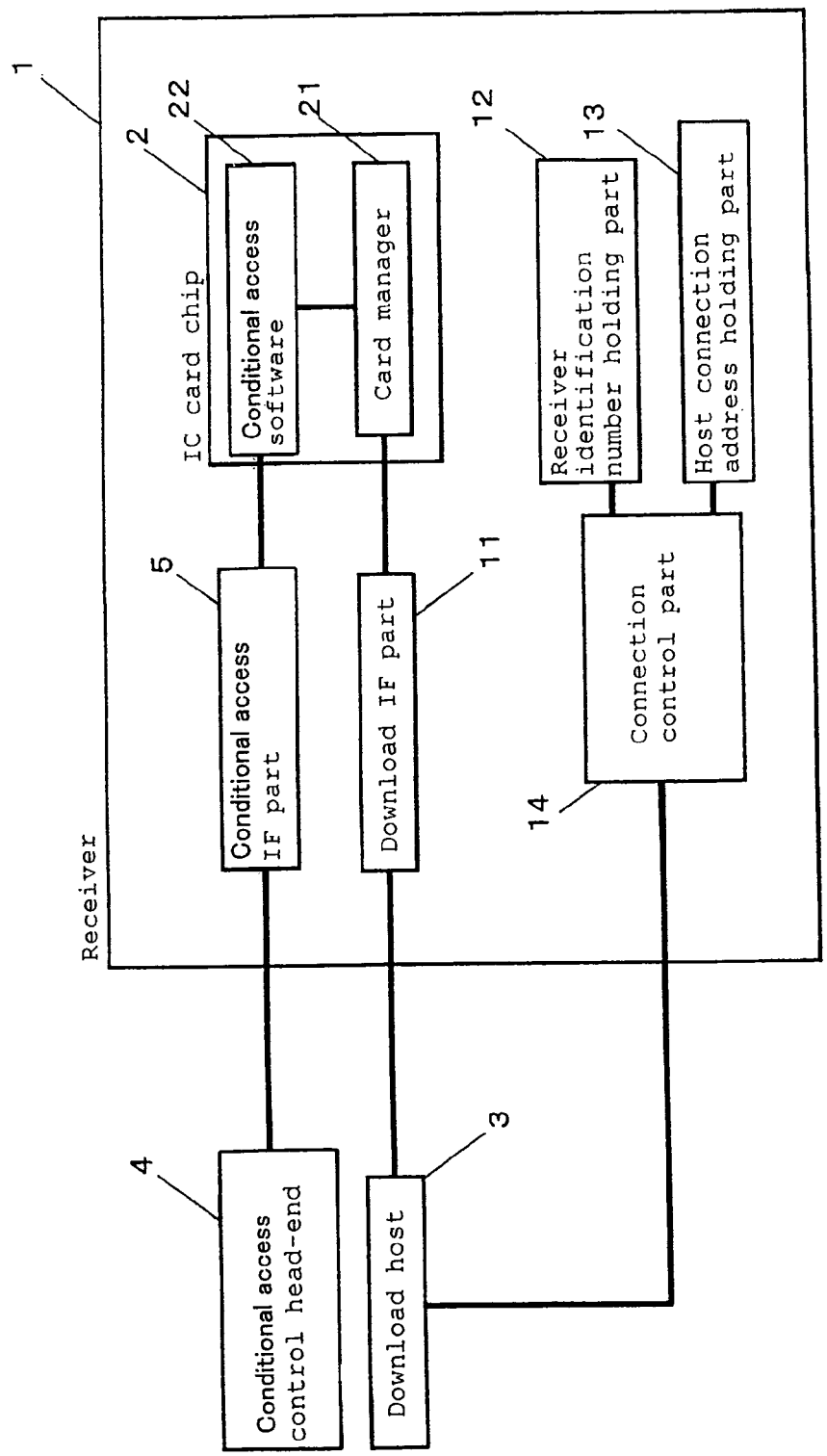
FIG. 4 is a block diagram showing the configuration of the cable television broadcasting receiver according to the invention.

FIG. 4 is a block diagram showing the configuration of the digital cable television receiver according to the invention. An IC card chip 2 built in the receiver 1 is an IC card chip that the above-mentioned card manager is built as a dedicated application or an IC card chip according to the global platform specifications. The case of a global platform specification is described below. A method of downloading the conditional access software is similarly made based on the global platform specifications. The receiver 1 is provided with a receiver identification number holding part 12 for holding the receiver identification number, a host connection address holding part 13 for holding the IP (Internet Protocol) address of the download host, and a connection control part 14 for making the access control from the receiver 1 to the download host 3, when there is a broadcast access from the download host 3. The download host 3 broadcasts (multi-cast) a request for connection to a group of receivers to download, for example, plural receivers under a specific CMTS (Cable Modem Termination System). The connection control part 14 decides the access start time to the download host 3, based on the receiver identification number read from the receiver identification number holding part 12, when there is a broadcast access from the download host 3. For example, when the lower four significant digits of the receiver identification number are 1101, the connection is started after 1101 seconds. In this way, the receiver 1 can be connected to the download host 3 without concentrated access to the download host 3 from a number of receivers. The connection from the receiver 1 is made via a modem (not shown), in which a DHCP (Dynamic Host Configuration Protocol) server within a network temporarily gives an IP address to the receiver 1.

In this example, the download 3 broadcasts access to the receivers 1. Besides this method, the head-end side may manage the MAC address of each receiver 1, and the download host 3 may inquire the DHCP server for the IP address to the MAC address of the receiver 1 to be connected to make access to the receiver 1 with the acquired IP address. If the conditional access software is already downloaded, the head-end sends the EMM to the receiver to be connected and the connection from the receiver 1 to the download host 3 may be made.

In addition, although the specification of a card chip is provided based on a global platform when this embodiment are described, it is the same even when a secure communication between the downloader and the IC chip is dedicatedly performed as described above, except that the portion of the card manager that serves the secure communication is dependent on the OS.

Also, although this embodiment is described as an IC chip, it is the same in the case of an IC card.

This invention is applicable to the digital cable television broadcasting receiver capable of downloading the conditional access software in the digital cable television broadcasting for conditional access.

What is claimed is:

1. A digital cable television broadcasting receiver comprising:
 a downloading part downloading conditional access software, as application software into an IC card chip, wherein
 a conditional access software decoding part is provided in a card manager of the IC card chip,
 a decoding key specific to a conditional access software vendor and a key identification number corresponding to the decoding key are preset in the conditional access software decoding part, and the conditional access software encrypted by the conditional access software vendor is decoded using the decoding key designated by the key identification number in the conditional access software decoding part, when the conditional access software is downloaded.

2. A digital cable television broadcasting receiver comprising:

a downloading part downloading conditional access software, as application software into an IC card chip; and a receiver identification number holding part specific to the digital cable television broadcasting receiver, which is used for saving a receiver identification number, wherein the conditional access software is provided with a receiver identification number reading part and a conditional access software identification number holding part, and after the conditional access software is downloaded, the receiver identification number saved in the receiver identification number holding part is read from through the receiver identification number reading part and notified to a download host, the conditional access software identification number specific to the IC card chip sent from the download host and a device key for conditional access are saved in the conditional access software identification number holding part, and the conditional access is performed based on said saved conditional access software identification number and conditional access device key, when a conditional access control command is received.

3. A digital cable television broadcasting receiver comprising:

a downloading part downloading conditional access software, as application software into an IC card chip; and a receiver identification number holding part specific to the digital cable television broadcasting receiver, which is used for saving a receiver identification number, wherein a card manager of the IC card chip is provided with a receiver identification number reading part and an authentication information generation part and when the card manager establishes a secure communication path with a download host to download the conditional access software, the authentication information generation part generates and notifies an authentication information to be notified to the download host, based on the receiver identification number read through the receiver identification number reading part from the receiver identification number holding part.

4. A digital cable television broadcasting receiver comprising:

a downloading part downloading conditional access software, as application software into an IC card chip; and a receiver identification number holding part specific to the digital cable television broadcasting receiver, which is used for saving a receiver identification number;

a connection address holding part, which is used for saving a connection address of a download host, and a connection control part connecting to the download host using the connection address, when there is a notice of connection instruction from the download host, wherein the connection control part connects to the download host after a time dependent upon the receiver identification number, read through the receiver identification number reading part from the receiver identification number holding part, when there is a notice of connection instruction broadcast from the download host, and the download host starts to download the conditional access software.

* * * * *